Aug. 9, 1938.　　　　L. E. HOLLOWAY　　　　2,126,552
APPARATUS FOR STERILIZING GRAPEFRUIT JUICE
Filed April 10, 1937
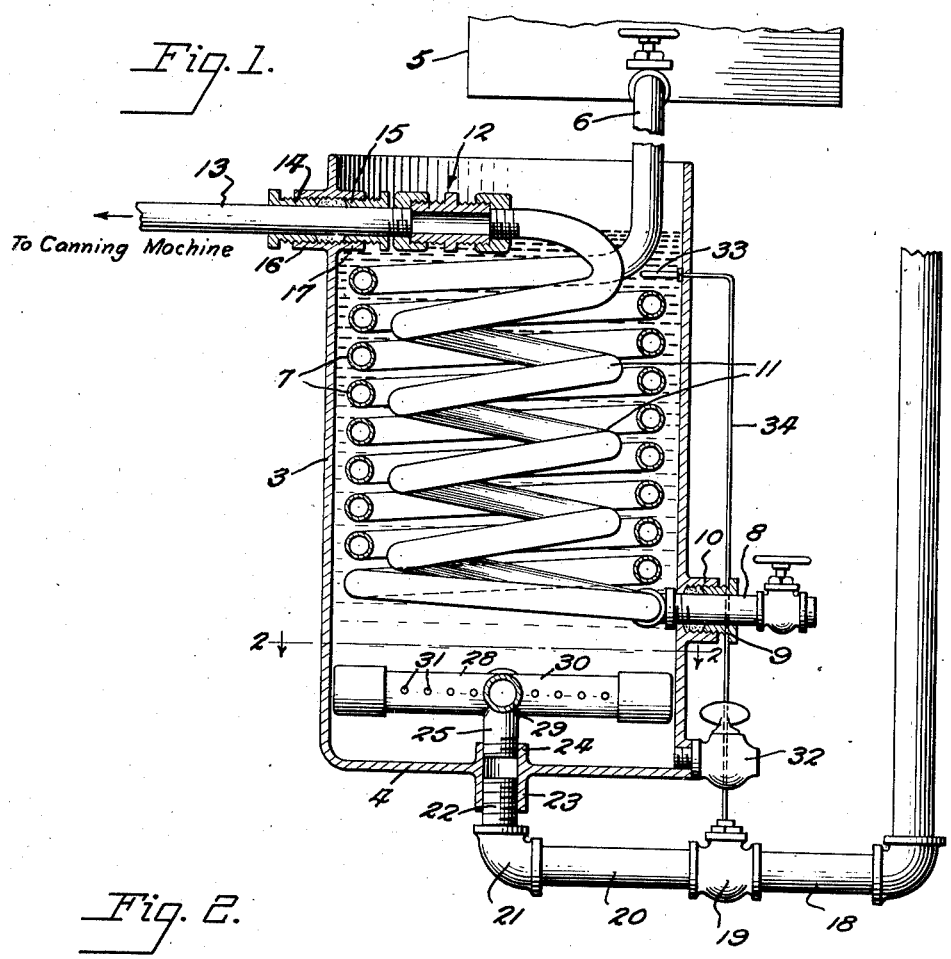
Inventor
L. E. Holloway Patented Aug. 9, 1938

2,126,552

UNITED STATES PATENT OFFICE 2,126,552

APPARATUS FOR STERILIZING GRAPEFRUIT JUICE

Lewis Emmette Holloway, Leesburg, Fla.

Application April 10, 1937, Serial No. 136,197

2 Claims. (Cl. 257—2)

The invention forming the subject matter of this application relates to apparatus for continuously sterilizing grapefruit juice, or juices of a similar character, wherein the flow of juice and sterilizing heat must be timed and controlled to accord with the rate of flow required to keep can filling machines properly supplied.

The main object of the invention is to provide an apparatus for applying a constant sterilizing heat for a predetermined time to a stream of grapefruit juice constantly flowing by gravity from a source of supply to a canning machine.

A further object of the invention resides in the process of heating a continuously flowing stream of grapefruit juice, and the like, for a period of time sufficient to sterilize the same thoroughly without causing such break down of the juice elements as to impart thereto a flat or burnt taste.

Other objects of the invention will become apparent as the detailed description thereof proceeds.

In the drawing:

Figure 1 is a central vertical section through the sterilizing part of the apparatus involved in carrying out this process; and Figure 2 is a horizontal section taken on the line 2—2 of Figure 1.

The apparatus for carrying out this process comprises a substantially cylindrical tank 3 having a bottom 4. The upper end of the tank is open; and the tank is intended to be filled with water practically to the top thereof. A supply reservoir 5 is arranged at a suitable distance above the top of the tank to provide a hydrostatic head for causing the juice to flow from the tank by gravity under pressure depending upon the head.

A pipe 6, connected to the reservoir 5, extends through the open top of the tank 3, and is bent to form an outer coil 7 having a series of closely spaced convolutions extending toward the bottom of the tank and connected to a valve controlled blow-out pipe 8, which extends through a packing gland 9 suitably secured to a screwthreaded boss 10 formed on the outer surface of the tank 3.

From the blow-out pipe 8, the piping of coil 7 is continued as an inner coil 11 upwardly to the top of the tank where its end is secured to one end of a fitting designated generally by the reference numeral 12. An outlet pipe 13 is secured to the other end of the fitting 12 and passes through packing glands 14 and 15 suitably secured to bosses 16 and 17 extending in opposite directions from the side of the tank 3 near the upper end thereof.

The water in the tank 3 is heated, preferably by means of steam derived from a suitable source of supply through the pipe 18, thermostatically controlled valve 19, pipe 20, and elbow 21 connected to a short section of pipe 22 which is screwthreaded into a boss 23 extending downwardly from the bottom 4 of the tank 3.

The bottom 4 of the tank 3 is provided with an upwardly projecting internally screwthreaded boss 24 receiving the downwardly extending branch 25 of a steam jet designated generally by the reference numeral 26. As shown in the drawing, the steam jet 26 is provided with any desired number of arms radially extending from the branch 25. Four of these arms 27, 28, 29 and 30 are shown in Figure 4, and each arm is provided with a series of jet apertures 31 through which the steam is forced to heat the water in the tank 3 and produce turbulence therein. The steam passes through the water to heat the same, and to effect such circulation of the heated water as to maintain its temperature practically constant throughout the tank 3. The bottom of the tank is provided with a valve controlled drain 32.

To control the temperature of the water in the tank 3, a thermostatic element 33 is mounted in the tank near the upper end of the submerged coils. This element 33 is suitably connected through the line 34 to the valve 19 to regulate the supply of steam from the source of supply to the tank, and in accordance with the temperature of the water in the tank adjacent the element 33.

The coils 7 and 11 have the numbers of their convolutions proportioned so that the time of downward flow of the juice in the tank 3 is about five times that of the upward flow through the inner coil 11. The piping of which the coils are made is of constant cross-section throughout the lengths thereof. This cross-section and relative lengths of coils are predetermined to raise and hold the juice at sterilizing temperature for a fixed period of time, and to suit the rate at which the juice must flow through the outlet 13 to supply the sterilized juice in quantity sufficient to fill the cans of a canning machine connected therewith.

It is to be understood that the invention is not to be considered as limited to the specific construction and arrangement described herein, since it is evident that many changes may be made without departing from the scope of the invention as defined by the claims appended hereto.

What I claim is:

1. Apparatus for sterilizing grapefruit juices comprising an open top container substantially filled with water, a reservoir for juice supported above the container, a pipe for conducting juice from the reservoir and bent to form concentric heating coils connected in series in the container, the outer coil being constructed to cause flow of the juice from the top to the bottom of the container, the inner coil rising from the lower end of the outer coil to discharge at the top of the container, means for heating the water in the container to sterilizing temperature, and means operable by the heat of said water for automatically controlling said heating means.

2. Apparatus for sterilizing grapefruit juices comprising an open top container substantially filled with water, a reservoir for juice supported above the container, a pipe for conducting juice from the reservoir and bent to form concentric heating coils connected in series in the container, the outer coil being constructed to cause flow of the juice from the top to the bottom of the container, the inner coil rising from the lower end of the outer coil to discharge at the top of the container, a spray device arranged in the container below said coils, a conduit connecting said device to a source of heated fluid, and means controlled by the temperature of the water in said container for automatically regulating the flow of heating fluid in said conduit.

LEWIS EMMETTE HOLLOWAY.